United States Patent [19]

Mizuno

[11] Patent Number: 5,219,128
[45] Date of Patent: Jun. 15, 1993

[54] PHOTOGRAPHIC FILM CASSETTE

[75] Inventor: Kazunori Mizuno, Kanagawa, Japan

[73] Assignee: Fuji Photo Film Co., Ltd., Kanagawa, Japan

[21] Appl. No.: 897,058

[22] Filed: Jun. 11, 1992

[30] Foreign Application Priority Data

Jun. 11, 1991 [JP] Japan .................. 3-167740

[51] Int. Cl.$^5$ .................. G03B 17/26
[52] U.S. Cl. .................. 242/71.1; 354/275
[58] Field of Search .................. 242/71.1, 71.7; 354/275; 206/397, 407, 409

[56] References Cited

U.S. PATENT DOCUMENTS

| | | | |
|---|---|---|---|
| 3,404,613 | 10/1968 | MacGregor et al. | 242/71.1 |
| 3,537,376 | 11/1970 | Fleming et al. | |
| 4,034,929 | 7/1977 | Ebner, Jr. | 242/71.1 |
| 4,074,870 | 2/1978 | Kaufman | 242/71.1 X |

FOREIGN PATENT DOCUMENTS 61-34526 10/1986 Japan .

Primary Examiner—John M. Jillions
Attorney, Agent, or Firm—Sughrue, Mion, Zinn, Macpeak & Seas

[57] ABSTRACT

A photographic film cassette has light-trapping members attached to a film passage mouth in order to close the film passage mouth. The inner end portions of the light-trapping members are spaced apart from each other so as to enable easy entrance of a leading end of a photographic film in between the light-trapping members. A frictional coefficient of the light-trapping member against the photographic film is 0.25 or less. The light-trapping member satisfies a following formula: $0.6 \text{ mm} < T_2 - T_1 < 4.0 \text{ mm}$, wherein $T_2$ is the thickness of each light-trapping member under a load of 20 g/cm$^2$ and $T_1$ is the thickness of each light-trapping member under a load of 100 g/cm$^2$.

15 Claims, 4 Drawing Sheets

PHOTOGRAPHIC FILM CASSETTE

BACKGROUND OF THE INVENTION

1. Field of the Invention

The present invention relates to a self-advancing type photographic film cassette and more particularly to improvements to light-trapping members to be attached to a film passage mouth.

2. Description of the Related Art

A conventional 135 type (35 mm) photographic film cassette is disclosed by Japanese Utility Model Publication No. 61-34526. Such a photographic film cassette has plush attached to a film passage mouth or a film passageway as light-trapping members so as to prevent ambient light from entering the film passage mouth. Recently, it is known to utilize a film cassette in which a leading end of a photographic film is advanced or propelled to an outside of a cassette shell by rotating a spool in a film unwinding direction. In such photographic film cassettes, it is necessary to reduce friction between the photographic film and the light-trapping members in order to propel the leading end smoothly through the film passage mouth out of the cassette shell with a small torque. For this purpose, various materials for the light-trapping members have been proposed in place of the conventional plush. For example, in a photographic film cassette disclosed in U.S. Pat. No. 3,537,376, light-trapping members comprise a flexible or compressible layer such as polyurethane and a facing layer having low coefficients of friction against the photographic film.

A leading end of the photographic film in the photographic film cassette shell disclosed in U.S. Pat. No. 3,537,376 is initially extended slightly to the outside of the cassette shell through the film passage mouth, and thus the construction of the photographic film cassette therein is not adaptable to the type of film cassettes in which the entire length of photographic film is initially contained in the cassette shell and its leading end is advanced out of the cassette shell by rotation of the spool. For example, the innermost portions of the light-trapping members are not adhered to the inside surfaces of the film passage mouth. Therefore, even if the spool were rotated so that the photographic film, including its leading end, were advanced out of the cassette shell, the leading end would be caught by the innermost ends of the light-trapping members making it impossible to advance the film out of the cassette shell. Further, the surfaces of the light-trapping members are easily damaged by creases and irregularities formed during manufacture. This causes a reduction in their light-trapping ability.

As the speed of photographic films has been highly improved recently, a high light-trapping ability of light-trapping members is required. However, when the above-mentioned flexible layer is pressed for a long time or heated, its flexibility decreases so as to deteriorate the light-trapping ability thereof. A facing layer is generally adhered to the flexible layer by a flame-laminating process in which the facing layer is attached to a heat-melted surface of the flexible layer. But, this flame-laminating method reduces the thickness of the completed light-trapping members, resulting in fogging of the photographic film. If the film passage mouth were made narrower or the thickness of the light-trapping members were made longer, as countermeasures for this, the required advancing torque would be increased.

SUMMARY OF THE INVENTION

It is therefore an object of the present invention to provide a photographic film cassette in which a leading end of a photographic film can be advanced out of a cassette shell with a small torque.

It is another object of the present invention to provide a photographic film cassette having light-trapping members which do not have creases and irregularities formed therein.

It is another object of the present invention to provide a photographic film cassette wherein a leading end of a photographic film can be advanced out of the film cassette with a small torque even though the flexibility and thickness of flexible layers of light-trapping members are different.

These and other objects of this invention are achieved by attaching, on the upper and lower inside surfaces of a film passage mouth of a cassette shell, light-trapping members whose inner end portions are spaced apart from each other. Each light-trapping member consists of a resilient layer and a facing layer which has a coefficient of friction of 0.25 or less against a surface of the photographic film. The light-trapping members are constructed to satisfy a formula: $0.6 \text{ mm} < T_2 - T_1 < 4.0 \text{ mm}$, wherein $T_1$ is a thickness of the light-trapping members when a load of 100 g/cm² is applied to each of the light-trapping members and $T_2$ is the thickness of the light-trapping members when a load of 20 g/cm2 is applied thereto. In a preferred embodiment of the present invention, the sheets as the facing layers, e.g., fabrics, are laminated on the respective flexible base layers which are soft sponges and have fluffs 0.1 to 1.0 mm in length.

According to this construction, creases and other irregularities can be prevented from being formed on the light-trapping members, thereby improving their light-trapping ability. In addition, a leading end of a photographic film can be advanced to the outside of the cassette sheet with a small torque. By utilizing the light trapping members of the subject invention, it is possible to make the film passage mouth smaller than when conventional plush is used. Accordingly, film cassettes which are more aesthetically pleasing can be constructed. Also, initial film advancement can be performed with a small torque while maintaining sufficient light-trapping ability, when the light-trapping members of the present invention are utilized.

BRIEF DESCRIPTION OF THE DRAWINGS

The above and other objects and advantages of the present invention will become more apparent from the following detailed description when read in connection with the accompanying drawings, in which.

DETAILED DESCRIPTION OF THE PREFERRED EMBODIMENTS

Figure 1:
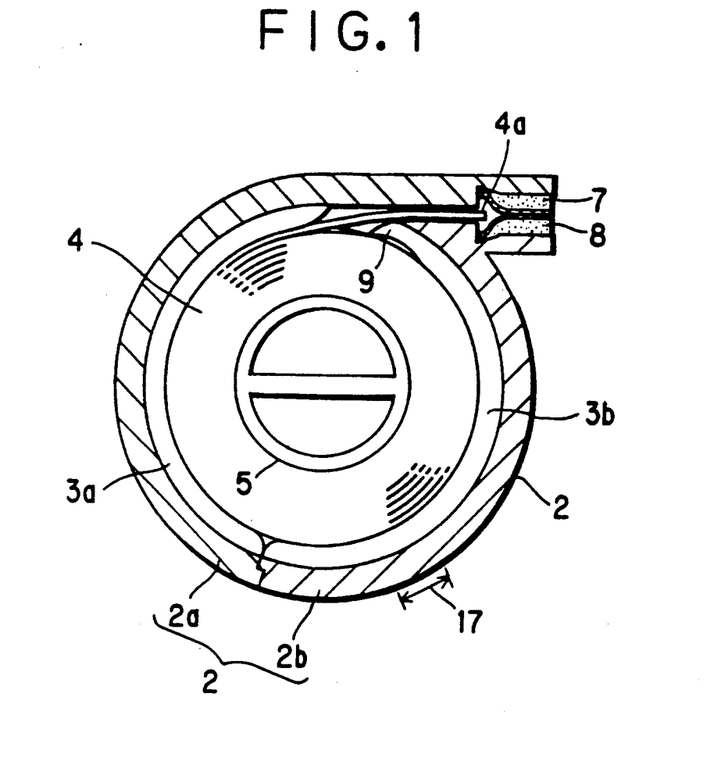
FIG. 1 is a cross section illustrating a photographic film cassette of a first embodiment according to the present invention.

Referring to FIG. 1, a photographic film cassette has a cassette shell 2 consisting of shell halves 2a and 2b. The shell halves 2a and 2b have annular ridges 3a and 3b formed on their inside circumferential surfaces so as to prevent a photographic film 4 from loosening. A trailing end of the photographic film 4 is secured to a spool 5 while a leading end 4a is contained within the cassette shell 2.

Figure 2:
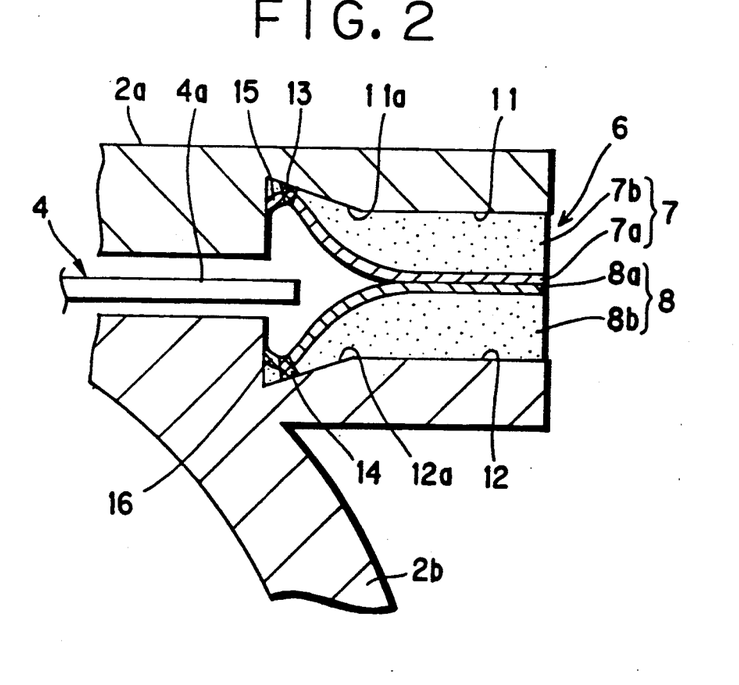
FIG. 2 is an enlarged cross section of a film passage mouth of the photographic film cassette illustrated in FIG. 1.

Referring to FIG. 2, recesses 11 and 12 are formed in the upper and lower inside surfaces of a film passage mouth or a film passageway 6 so as to attach light-trapping members 7 and 8. The inner portions of the recesses 11 and 12 are cut diagonally and deeply to form inclined surfaces 11a and 12a. The light-trapping members 7a and 8 are partially attached to the inclined surfaces 11a and 12a at areas 13 and 14 by an ultrasonic welding process. The inner ends of the light-trapping members 7 and 8 are thus spaced apart from each other so as to facilitate the entrance of the leading end 4a of the photographic film 4 between the light-trapping members 7a and 8 when the spool 15 is rotated in an unwinding direction. The length between the upper and lower inside surfaces of the film passage mouth 6 is, e.g., 2.0 mm.

The friction of the light-trapping members against the surfaces of the photographic film and the compressibility or flexibility of the light-trapping members influence greatly the force necessary for the initial advancement of the leading end 4a of the film 4 out of the cassette shell 2. In order to facilitate the initial film advancement, it is preferable to limit the frictional coefficients to 0.25 or less. The compressibility can be expressed by a difference DT between thicknesses $T_1$ and $T_2$ of the light-trapping members 7 and 8 measured by applying different loads. $T_1$ represents the thickness of the light-trapping members 7 and 8 when a load of 100 g/cm$^2$ is applied to each and $T_2$ is the thickness of those when a load of 20 g/cm$^2$ is applied thereto. It is preferable that the difference DT ($T_2-T_1$) satisfies the equation 0.6 mm$<$DT$<$4.0 mm.

The light-trapping members 7 and 8 consist of sheets with fluffs as facing layers and flexible or compressible materials as base layers. If it is possible to maintain the above-mentioned limit of the coefficients of friction, a material for the sheets can be selected from among woven and knitted fabrics of synthetic fiber such as nylon, polyester and acrylic, regenerated fiber such as rayon, cupro and natural fiber such as cotton, silk and sheep wool; non-woven fabrics; synthetic leathers; fluffy materials; flocked material and films. It is desirable that the synthetic fiber is of an antistatic type or is subjected to an antistatic treatment.

The flexible material can be selected from among polyurethane sponges and expanded materials of polyolefin system and polystyrene system. If a flame-laminating process is used, it is desirable to select the polyurethane system, since the production efficiency thereof is high.

In this embodiment, fabrics 7a and 8a are used for the sheets and soft polyurethane sponges 7b and 8b are used for the flexible layers. The adhesion of the fabrics 7a and 8b to the sponges 7b and 8b is performed by flame-laminating or sewing. The sponges 7a and 7b are contracted and deformed by heat when attaching them to the film passage mouth 6. Since the innermost portions of the sponges 7a and 7b are spaced apart from each other by this contraction and deformation, the bottoms of the recesses 11 and 12 may be flat without the inclined surfaces 11a and 12a formed therein.

In order to lower frictional coefficients between the film 4 and the fabrics 7a and 8b, the surfaces of the fabrics 7a and 8a may be flattened by a calender roller or coated with a lubricant such as silicon. The lubricant may be applied to the surfaces of the fabrics 7a and 8a by soaking, spraying or by a roller with the lubricant thereon after the dying process or the laminating process of the fabrics 7a and 8a on the sponges 7b and 8b.

The attachment of the light-trapping materials 7 and 8 to the film passage mouth 6 can be performed by ultrasonic welding, heat-welding, dielectric heating, machine screws, a hot-melt adhesive, an instant adhesive which manifests adhesive power instantly after contact, or a continuously sticky type of adhesive.

The surfaces of the fabrics 7a and 8a may be fluffed in order to prevent scratches on the photographic film 4 caused by the catching of dirt particles. If the fabrics 7a and 8a are formed of a non-woven fabric, their surfaces may have irregularities. If the irregularities are formed so as to be inclined obliquely relative to a film advancing direction, ambient light shielding characteristics are improved.

A carbon black or a black pigment can be used to dye the sponges 7b and 8b. The dying of the fabrics 7a and 8a can be performed by a spinning-dying process at the stage of spinning or by a yarn-dying process. Carbon fibers can also be used.

In order to prevent a ribbon from being frayed when cutting it so as to form the fabrics 7a and 8a, the ribbon may be subjected to a calendering process. Also, it is possible to use threads having filaments surrounding a wadding having low melting temperatures. Further, the threads of woven or knitted fabrics may be adhered to each other, by a resin treatment, at adjacent points.

Several examples and comparative examples will be discussed below to explain the present invention in greater detail.

EXAMPLE 1

The light-trapping members 7 and 8 consisted of fabrics 7a and 8a which are 0.1 mm thick and respective soft polyurethane sponges 7b and 8b which are 3.1 mm thick (measured by applying a load of 5 g/cm$^2$). A polyester thread of 70 denier consisting of 20 filaments was used to form a ribbon of a plain woven fabric in which a warp thread inlaying density was 90 threads/inch and a weft thread inlaying density was 120 threads/inch. The ribbon of the plain woven fabric was dyed by a black disperse dye of 5% on the weight of fiber (o.w.f.) and thereafter subjected to an antistatic treatment by Parmalose TM (trade name: ICI Ltd.) of 4% o.w.f. Then, the ribbon was cut to form the fabrics 7a and 8a.

The apparent density and the compressive permanent set of the sponges 7b and 8b were 22 kg/m$^3$ (based on Japanese Industrial standard (JIS K6401) and 10% (based on JIS K6401). The compressive permanent set was calculated by a formula $[(t_0-t_1)/t_0]\times 100$. In the formula, $t_0$ represents the initial thickness of the sponges 7 and 8. $t_1$ represents the thickness thereof measured after under going the following two processes. First, each of the sponges 7 and 8 had a 50% compression applied thereto at 70° C. for 22 hours and then was kept for 30 minutes at room temperature without the compression. The fabrics 7a and 8a, as the facing layers, were attached to the sponges 7b and 8b, as the base layers, by means of flame-laminating wherein the surfaces of the sponges 7b and 8b are melted by flame and then the fabrics 7a and 8a are pressed thereon.

As a result, 0.6 mm of the sponges 7b and 8b, which are 3.1 mm thick, were melted and the thickness of the light-trapping members 7 and 8 became 2.6 mm. When a load of 100 g/cm$_2$ was applied to each of the light-trapping members 7 and 8, the thickness $T_1$ of the light-trapping members became 0.9 mm. When a load of 20 g/cm$_2$ was applied to each of the light-trapping members 7 and 8, the thickness $T_2$ thereof became 2.4 mm. The difference DT between the thickness $T_1$ and the thickness $T_2$ was 1.5 mm.

Figure 3:
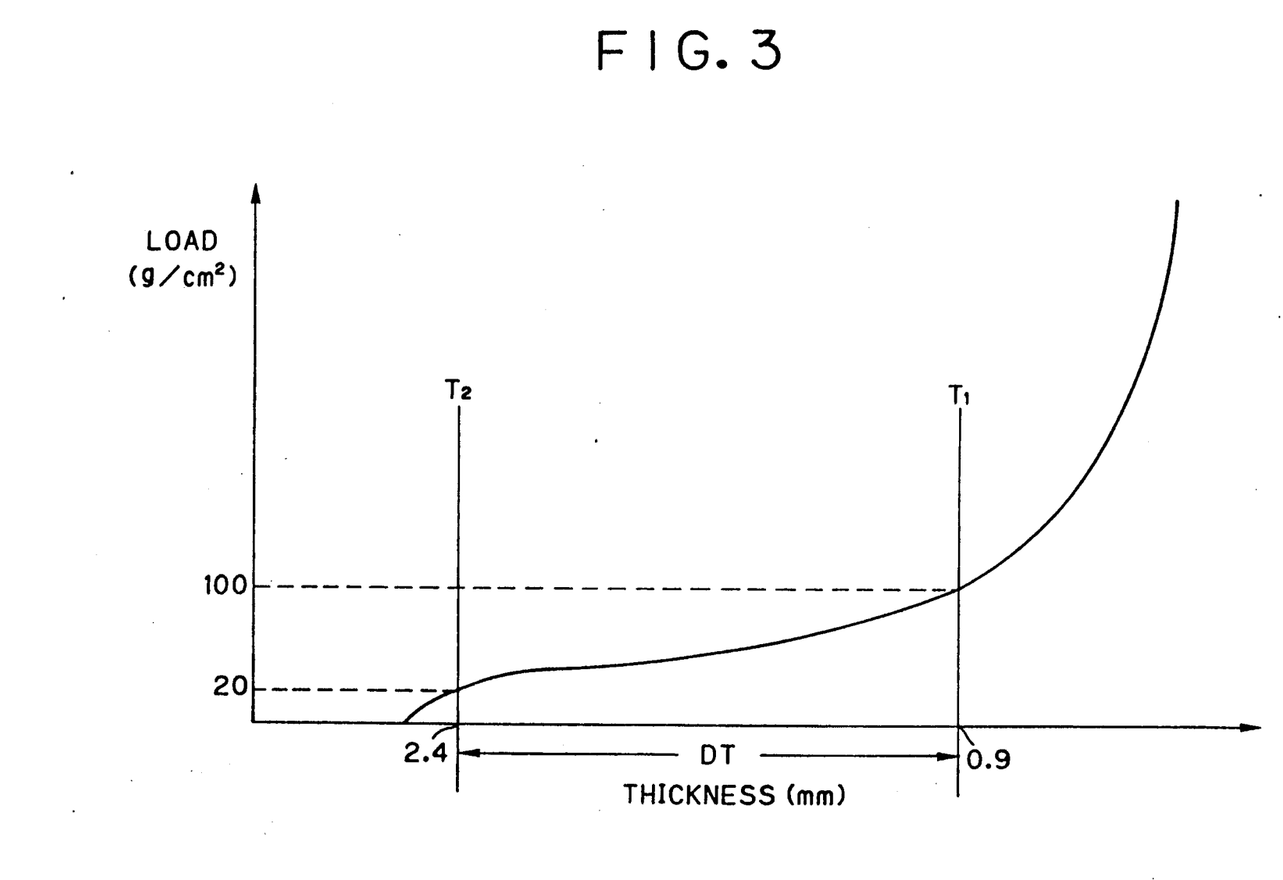
FIG. 3 is a graph illustrating the compression characteristics of light-trapping members.

FIG. 3 illustrates the compression characteristics of the light-trapping members 7 and 8. If the difference DT is 0.6 mm or less, the photographic film 4 may become fogged due to slight aberrations of the thickness of the light-trapping members 7 and 8 and may not be reliably advanced out of the cassette shell 2 in a camera since a larger advancing torque would be required due to the larger required pressing force of the light-trapping members 7 and 8. If the difference DT is 4.0 mm or more, the restoring force of the light-trapping members 7 and 8 against their deformation might become strong and cause creases and irregularities thereof, resulting in fogging of the photographic film 4. The coefficient of friction of the surface of the light-trapping member 8a against the back surface of the photographic film 4 was 0.20, while that of the surface of the light-trapping member 7a against the emulsion surface of the photographic film 4 was 0.15, when FUJI COLOR SUPER HG 400 (trade name: Fuji Photo Film Co., Ltd.) was used as the photographic film 4.

The coefficients of friction of the fabrics 7a and 8a were measured based on the method written Journal of the Textile Machinery Society of Japan (Fiber Engineering) Vol. L. 33, No. 2 (1980). For this measurement, ten piano wires of 0.5 mm in diameter which were each bent in a rectangular shape, arranged in parallel and moved on the fabric 7a and 8a for a predetermined distance while pressing the piano wires thereon with a force W e.g., 50 gf. Friction forces F yielded at this time were measured by the KES-FB 4 measuring machine (trade name: KATO TECH Co., Ltd.). The average value of the friction forces F was then divided by the force W to obtain averaged friction coefficients of the fabrics 7a and 8a.

EXAMPLE 2

A polyester thread of 250 denier/60 filaments was used to form a ribbon of a plain woven fabric of 0.2 mm thick in which both warp and weft thread inlaying densities were 50 threads/inch. The ribbon of the polyester plain woven fabric was dyed by a black disperse dye of 4% o.w.f. and thereafter subjected to an antistatic treatment by Permalose TM of 4% o.w.f. The ribbon was cut to obtain the fabric 7a and 8a to form the light-trapping members 7 and 8 in the same manner as Example 1.

EXAMPLE 3

The sponges 7b and 8b were flexible polyurethane sponges having an apparent density of 35 kg/m$^3$, a compressive permanent set of 4% and a thickness of 3.1 mm (measured under a load of 5 g/cm$^2$). Then, the same fabrics 7a and 8a as in Example 1 were attached to such sponges 7b and 8b by flame-laminating to obtain the light-trapping members 7 and 8 of 2.5 mm thick. When the light-trapping members 7 and 8 were measured in the same manner as in Example 1, $T_1$, $T_2$ and DT were 1.7 mm, 2.4 mm and 0.7 mm, respectively. The other processes were the same as in Example 1.

EXAMPLE 4

A ribbon was a tricot fabric formed of polyester threads of 75 denier/30 filaments. The ribbon was fluffed by a raising machine and then subjected to a dying process and an antistatic treatment. The ribbon was then cut at a predetermined size to obtain the fabrics 7a and 7b, which were then attached to the sponges 7b and 8b in the same manner as in the Example 1.

Comparative Example 1

A hard polyurethane sponge having an apparent density of 45 kg/m$^3$ and a compressive permanent set of 20% was used to form the sponges. Then the same fabrics as in Example 1 were attached to the sponges by flame-lamination to obtain light-trapping members of 2.1 mm thick. $T_1$, $T_2$ and DT were 1.6 mm, 2.0 mm and 0.4 mm, respectively. The other processes were the same as in Example 1.

Comparative Example 2

A plain woven nylon fabric coated with a urethane resin was used to form the fabrics, which were than attached to the same sponges as in Example 1 by flame-laminating to obtain the light-trapping members. The friction coefficient of the light-trapping members against the photographic film wa 0.30. The other processes were the same as in Example 1.

The light-trapping members of each of Examples 1 to 4 and the Comparative Examples were attached to a film passage mouth of a cassette shell to obtain a film cassette as illustrated in FIG. 1. Each photographic film cassette was subjected to measurements to obtain results as illustrated in Table 1. In measuring the advancing torque, the torque applied to the spool 5 was measured when the leading end was advanced out of the cassette shell 2.

The measurement of the light-trapping ability was performed through two methods. In the first method, the photographic film cassette was illuminated under 70,000 lux for 3 minutes with the leading end of the photographic film contained in the cassette shell. Thereafter, occurrence of fogging of the photographic film was checked after development. In the second method, the leading end was pulled out of the cassette shell, bent and attached to a lower portion 17 (in FIG. 1) of the cassette shell so that the lower light-trapping member 8 was compressed by the photographic film 4. In that condition, the photographic film cassette was heated at a temperature of 70° C. for 22 hours. When 30 minutes passed after the leading end had been again contained in the cassette shell, the photographic film cassette was illuminated under 70,000 lux for 3 minutes.

Thereafter, occurrence of fogging of the photographic film was checked. In the two-way measurements, when no fogging was observed, it was evaluated as "0." When fogging was observed either up to the outermost turn or up to the second turn, it was evaluated as 1 or 2, respectively.

In measuring the leading end advancing rate, the leading end of the photographic film was advanced 30 times out of the cassette shell, and if the number of exits of the leading end from the film passage mouth was n, the leading end advancing rate was calculated from a formula, $(n/30) \times 100$.

In Table 1, the values in parentheses in the columns of the advancing torque, the light-trapping ability and the leading end advancing rate were results obtained by the light-trapping ability test.

TABLE 1

| | DT (mm) | Thickness (mm) | Friction Coefficient | Advancing Torque | Light Trapping Ability | Leading End Advancing Rate (%) |
|---|---|---|---|---|---|---|
| Example 1 | 1.5 | 2.6 | 0.20 | 200 (230) | 0 (0) | 100 (100) |
| Example 2 | 1.5 | 2.7 | 0.18 | 185 (190) | 0 (0) | 100 (100) |
| Example 3 | 0.7 | 2.5 | 0.20 | 285 (320) | 0 (0) | 100 (100) |
| Example 4 | 1.5 | 3.2 | 0.15 | 175 (190) | 0 (0) | 100 (100) |
| Comparative Example 1 | 0.4 | 2.1 | 0.20 | 580 (650) | 1 (2) | 83 (87) |
| Comparative Example 2 | 1.5 | 3.2 | 0.30 | 430 (530) | 0 (0) | 87 (93) |

As is apparent from Table 1, the light-trapping ability of the light-trapping members 7 and 8 according to each of Examples 1 to 4 was preferable and the respective advancing torques were also low. Although the difference DT of each of Examples 1 to 4 satisfied 0.6 mm < DT < 4.0 mm, the difference DT of Comparative Example 1 became too low, so as to cause higher resistance of the light-trapping members, increasing the advancing torque. Also, a hard polyurethane sponge was used in Comparative Example 1, so that the plastic deformation thereof after compression was large, resulting in the invasion of light. When the coefficients of friction of the light-trapping members against the photographic film exceeds 0.25, the advancing torque is correspondingly increased as in Comparative Example 2. Further, although the light-trapping members 7 and 8 of Example 2 were attached to the film passage mouth 6 after being bent once, no reduction in the light-trapping ability occurred, proving that the materials used therein are resistant to wrinkles.

Figure 4:
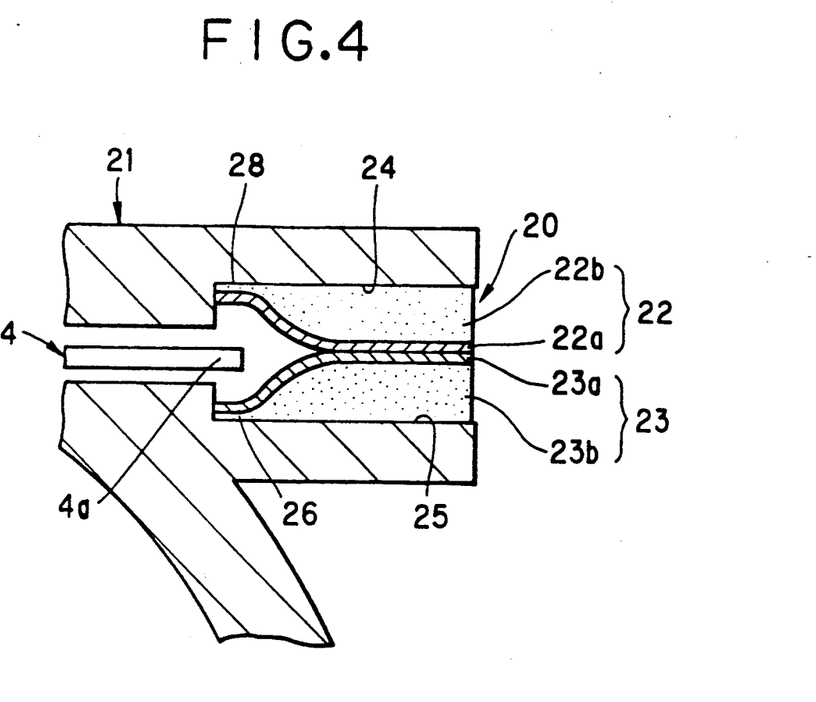
FIG. 4 is an enlarged cross section of a film passage mouth of a photographic film cassette according to a second embodiment of the present invention.
Figure 5:
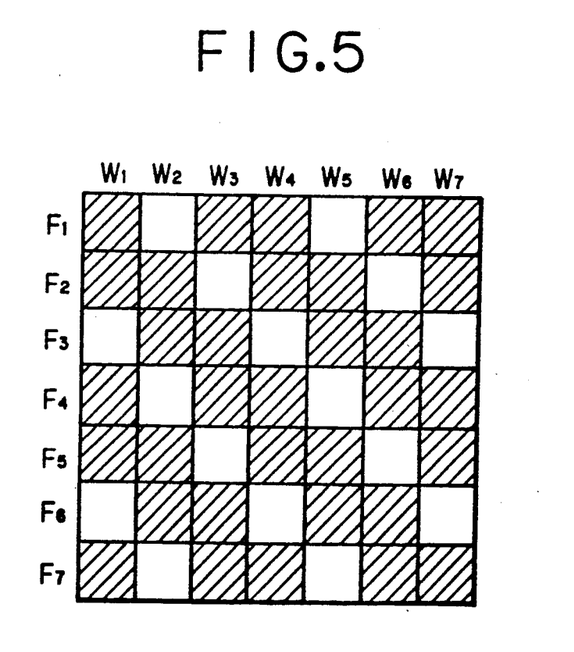
FIG. 5 illustrates a weave of a fabric used for surface layers of the light-trapping members illustrated in FIG. 4.
Figure 6:
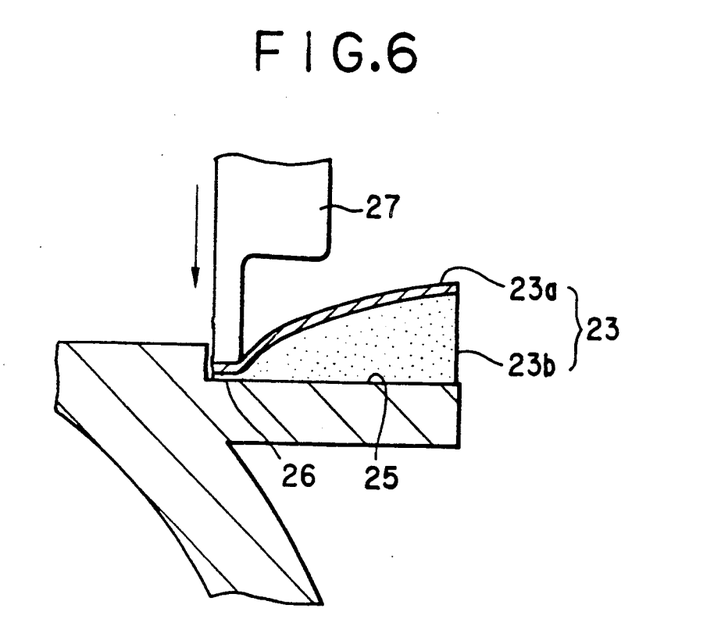
FIG. 6 is an explanatory diagram illustrating how to attach light-trapping members to the film passage mouth illustrated in FIG. 4 by an ultrasonic welding machine.

Examples 5 to 7 and Comparative Example 3 will be described with reference to FIGS. 4 to 7, wherein sheets with fluffs are used as the facing layers of light-trapping members. In FIG. 4 illustrating a film passage mouth 20 of a photographic film cassette 21, light-trapping members 22 and 23 are attached to recesses 24 and 25 formed in upper and lower inside surfaces of the film passage mouth 20. The light-trapping members 22 and 23 consist of sheets 22a and 23a and sponges 22b and 23b. The recesses 24 and 25 have flat bottom surfaces in contrast to the above-described Examples and Comparative Examples which have inclined surfaces. As illustrated in FIG. 6, an innermost end 26 of the light-trapping member 23 is attached to the recess 25 by an ultrasonic horn 27 of an ultrasonic welding machine. The light-trapping member 22 is also attached at an innermost end 28 in the same manner.

EXAMPLE 5

A polyester thread of 70 denier/20 filaments was used to form a ribbon of a twill fabric in accordance with a weave illustrated in FIG. 6 in which one warp thread overlies two weft threads and underlies one weft thread alternately. The warp and weft inlaying densities were 150 threads/inch and 140 threads/inch respectively. In FIG. 6, W and F indicate warp and weft threads respectively. In hatched portions, warp threads overlie weft threads. The ribbon of the twill fabric was dyed by the black disperse dye of 4% o.w.f. and thereafter subjected to an antistatic treatment by Parmalose TM. At this time, the thickness of the ribbon was 0.15 mm. The ribbon was then treated for raising by a cylindrical sand grinder to form short loops 0.2 mm long, as fluffs, and cut at a predetermined size to obtain the sheets 22a and 23a.

The sponges 22b and 23b of the light-trapping members 22 and 23 were of soft polyurethane such as EV-ERLIGHT ST (trade name: Bridgestone Corporation), having an apparent density of 60 kg/m$^3$ (JIS K6401). The thickness of the sponges 22b and 23b under a load of 5 g/cm$^2$ was 3.1 mm. The sheets 22a and 23a, as the facing layers were adhered to the sponges 22b and 23b by flame-lamination to obtain the light-trapping members 22 and 23. As a result, the thickness of the resultant light-trapping members 22 and 23 became 2.7 mm since 0.6 mm of each of the sponges 22b and 23b was melted in thickness. The thickness $T_1$ of each light-trapping member 22 and 23 under a load of 100 g/cm$^2$ was 2.4 mm. The difference DT was 1.5 mm. The coefficients of friction between the sheets 22a and 22b and the back and emulsion surfaces of the photographic film 4 were respectively 0.20 and 0.15.

EXAMPLE 6

Figure 7:
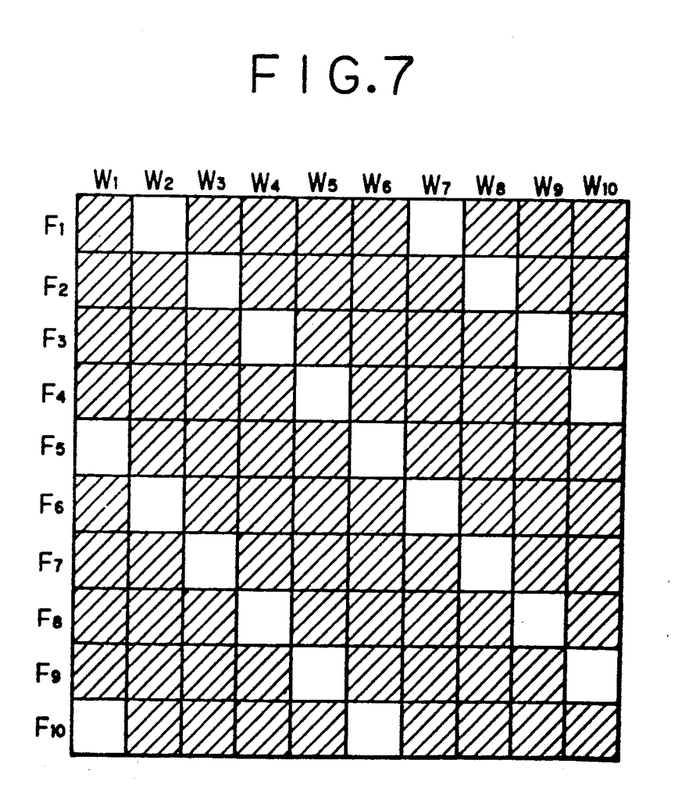
FIG. 7 illustrates a weave of another fabric used for the surface layers of the light-trapping members.

A ribbon of a five satin fabric consisting of a warp thread of 50 denier/36 filaments and a weft thread of 70 denier/20 filaments was woven in accordance with a weave as illustrated in FIG. 7 wherein one warp thread overlies four weft threads and underlies a weft thread alternately. The ribbon was subjected to the raising treatment to form loops of 0.5 mm long as fluffs and cut at the predetermined size to obtain the sheets 22a and 23. The sheets 22a and 23a as the facing layers were then adhered to the sponges 22b and 23b to form the light-trapping members 22 and 23 the same as in Example 5. The thickness of the light-trapping members 22 and 23 was 3.2 mm. The other processes were the same as in Example 5.

EXAMPLE 7

The ribbon was formed by planting 0.4 mm nylon piles as fluffs in a black polyester base of 50 μm thick. The nylon piles had been subjected to an antistatic treatment prior to the planing. The thickness of the ribbon was 0.5 mm. The ribbon was cut to form the sheets 22a and 23a which were adhered to the sponges 22b and 23b by the flame-laminating to form the light-trapping members 20 whose resultant thickness was 3.0 mm. The processes were the same as in Example 5.

COMPARATIVE EXAMPLE 3

A ribbon of a double velvet was woven which consisted of a rayon warp thread of 120 denier, a rayon weft thread of 150 denier and a 66 nylon pile thread of 100 denier/36 filaments. The ribbon was cut to a predetermined size to obtain sheets, which were then adhered to the sponges the same as in Example 5, to form light-trapping members whose piles as fluffs were 1.5 mm long. The other processes were the same as in Example 5.

The light-trapping members of Examples 5 to 7 and Comparative Examples 3 were each attached to three types of photographic film cassettes having respective 3 mm, 2.5 mm and 2 mm film passage mouths in height. Then, measurements were performed for each photographic film cassette in the same manners as for Examples 1 to 4 and Comparative Examples 1 and 2. The results of the measurements are shown in Table 2.

TABLE 2

| | DT (mm) | Thickness (Fluffs) (mm) | Friction Coefficient | Film Passage Mouth Height (mm) | Advancing Torque (g.cm) | Light Trapping Ability |
|---|---|---|---|---|---|---|
| Example 5 | 1.5 | 2.7 (0.2) | 0.15 | 3 | 120 | 0 |
| | | | | 2.5 | 180 | 0 |
| | | | | 2 | 250 | 0 |
| Example 6 | 1.5 | 3.2 (0.5) | 0.18 | 3 | 135 | 0 |
| | | | | 2.5 | 200 | 0 |
| | | | | 2 | 280 | 0 |
| Example 7 | 1.0 | 3.0 (0.4) | 0.20 | 3 | 150 | 0 |
| | | | | 2.5 | 210 | 0 |
| | | | | 2 | 300 | 0 |
| Comparative Example 1 | 1.7 | 3.8 (1.5) | 0.30 | 3 | 480 | 0 |
| | | | | 2.5 | 790 | 0 |
| | | | | 2 | 1200 | 0 |

As apparent from Table 2, the light-trapping ability of the respective light-trapping members 22 and 23 according to Examples 5 to 7 was preferable and the respective advancing torques were also low. Even in the photographic film cassettes having the narrower film passage mouth, the advancing torques were not increased. Accordingly, a sure initial advancement of the photographic films out of the photographic film cassettes 21 was insured. As a result, it is possible to form a smaller film passage mouth, contributing to production of photographic film cassettes having more pleasing external appearances.

On the other hand, the piles of the light-trapping members of Comparative Example 3 were too long, whereby entanglement of the piles occurred so as to cause the required advancing torque to increase. This trend appeared conspicuously as the height of the film passage mouth became narrower. When the advancing torques exceeded 700 g.cm, there occurred cases in which the photographic film was not at all advanced out of the photographic film cassette. Accordingly, it was learned that when using the sheets with fluffs of 0.1 to 1.0 mm long, the leading end of the photographic film could be advanced with a relatively small required torque.

The light-trapping members of this embodiment are adhered to the film passage mouth partially at inner portions, but may be adhered thereto over the entire surfaces of the light-trapping members. If the light-trapping members are attached by an adhesive or the sponges are a material which is not contracted by the ultrasonic welding, it is necessary to groove the innermost portions of the upper and lower surfaces of the film passageway, as illustrated in FIG. 2. The light-trapping members may be also attached so that the inner ends are folded in an L-shape and adhered to stepped portions. Although the inner end portions of the light-trapping members are spaced apart from each other by crushing the inner end portions of the sponges by ultrasonic welding in this embodiment, the same effect can be accomplished by making the thickness of the inner end portions of the sponges small.

While the present invention has been described in detail with reference to a preferred embodiment, various modifications within the scope and sprint of the invention will be apparent to those of working skill in this technological field. Thus, the invention should be considered as limited only by the appended claims.

What is claimed is:

1. A photographic film cassette having a cassette shell and a spool with a photographic film wound thereon, a leading end of said photographic film being advanced through a film passage mouth formed in said cassette shell by rotation of said spool, said photographic film cassette comprising:

a pair of light-trapping members disposed respectively on upper and lower inside surfaces of said film passage mouth in order to close said film passage mouth, respective inner end portions of said light-trapping members being spaced apart from each other; and said light-trapping members having a coefficient of friction of 0.25 or less with respect to said photographic film and satisfying the following formula:

$$0.6 \text{ mm} < T_2 - T_1 < 4.0 \text{ mm}$$

wherein $T_1$ is a thickness of each of said light-trapping members under a pressure of 100 g/cm$^2$, and $T_2$ is a thickness of each of said light-trapping members under a pressure of 20 g/cm$^2$.

2. A photographic film cassette as recited in claim 1, wherein each of said light-trapping members consists of a flexible base layer and a facing layer laminated on said flexible base layer.

3. A photographic film cassette as recited in claim 2, wherein said facing layers have fluffs which are 0.1 to 1.0 mm long.

4. A photographic film cassette as recited in claim 3, wherein said flexible base layers are each a soft sponge.

5. A photographic film cassette as recited in claim 4, wherein said sponges are attached over an entire surface thereof to said film passage mouth.

6. A photographic film cassette as recited in claim 4, wherein respective innermost partial areas of said sponges are attached to said film passage mouth.

7. A photographic film cassette as recited in claim 6, wherein said sponges are compressed in the vicinity of said respective innermost partial areas.

8. A photographic film cassette as recited in claim 7, wherein said upper and lower inside surfaces of said film passage mouth each have a recess formed therein whose inner end portion is cut obliquely and deeply so as to form an inclined surface, a spacing between said inclined surfaces becoming larger toward the inside of said cassette shell.

9. A photographic film cassette as recited in claim 4, wherein said light-trapping members are dyed black by one of a carbon black and a black pigment.

10. A photographic film cassette as recited in claim 9, wherein said facing layers are a fabric.

11. A photographic film cassette as recited in claim 10, wherein said fabrics are subjected to an antistatic treatment.

12. A photographic film cassette as recited in claim 11, wherein attachment of said fabrics to said sponges are performed by melting surfaces of said sponges by flame and instantly pressing said fabrics on the melted surfaces.

13. A photographic film cassette as recited in claim 12, wherein a material for said sponges is made of polyurethane system.

14. A photographic film cassette as recited in claim 13, wherein surfaces of said fabric layers are calendered.

15. A photographic film cassette as recited in claim 13, wherein surfaces of said fabrics are coated with a lubricant.

* * * * *